United States Patent [19]

Gilmore

[11] Patent Number: 4,457,489

[45] Date of Patent: Jul. 3, 1984

[54] SUBSEA FLUID CONDUIT CONNECTIONS FOR REMOTE CONTROLLED VALVES

[76] Inventor: Samuel E. Gilmore, 5119 Pine St., Bellaire, Tex. 77401

[21] Appl. No.: 282,429

[22] Filed: Jul. 13, 1981

[51] Int. Cl.³ .............................................. F16L 37/28
[52] U.S. Cl. ............................... 251/148; 137/596.18; 137/625.66; 166/344; 277/27; 285/131; 285/137 R
[58] Field of Search ...................... 285/135, 137 R, 91, 285/106, 101, 137 A; 137/625.66, 596.18; 277/3, 27; 251/159, 148; 166/341, 344

[56] References Cited

U.S. PATENT DOCUMENTS

| | | | |
|---|---|---|---|
| 2,688,981 | 9/1954 | Greer et al. | 277/27 |
| 3,326,579 | 6/1967 | Fowler | 285/137 R |
| 3,460,614 | 8/1969 | Burgess | 137/596.18 |
| 3,554,277 | 1/1971 | McNeill et al. | 166/344 |
| 3,701,549 | 10/1972 | Koomey et al. | 285/131 |
| 3,817,281 | 6/1974 | Lewis et al. | 166/341 |
| 3,820,600 | 6/1974 | Baugh | 285/131 |
| 3,840,071 | 10/1974 | Baugh et al. | 166/344 |
| 4,215,722 | 8/1980 | Sigmon | 251/159 |
| 4,328,826 | 5/1982 | Baugh | 285/131 |
| 4,404,989 | 9/1983 | LeMoine | 137/596.18 |

Primary Examiner—A. Michael Chambers
Attorney, Agent, or Firm—Murray Robinson; Ned L. Conley; David A. Rose

[57] ABSTRACT

A quick attachable and detachable multiple connection between fluid conduits provided in a stepped cylindrical socket and remote actuated valve controlled fluid conduits in a stepped cylindrical plug hydraulically locked therein, the connection between the conduits comprising seal tube means extendable from within each plug conduit to abut against the inner periphery of the socket around the outside of the adjacent socket conduit and form a face seal therearound.

33 Claims, 9 Drawing Figures

SUBSEA FLUID CONDUIT CONNECTIONS FOR REMOTE CONTROLLED VALVES

BACKGROUND OF THE INVENTION

Especially with reference to hydraulic conduits for actuating subsea petroleum well drilling equipment, such as blowout preventers, it is known to provide an underwater non-destructive quick attachable and detachable or fast multiple connection between fluid conduits going to the blowout preventers, or other underwater remote actuated devices or functions, and subsea valve controlled fluid conduits going to the surface, where an operator can actuate surface devices for remote control of the subsea valves and associated functions. See, for example, the apparatus disclosed at pages 6144-6149 of the 1978-79 edition of the Composite Catalog of Oilfield Equipment and Services and the Catalog of Valve Control Company entitled "1978 Catalog BOP Control Systems" published by the Valvcon division of Hydril Co., and pages 4494-10 to 4494-18 of the 1970-71 issue of the Composite Catalog, and U.S. Pat. No. 3,701,549 to Koomey, De Vries, and Gilmore, 3,460,614 and 3,486,556 to Burgees, and 3,326,579 to Fowler, and the references therein to prior patents.

The fast multiple connections disclosed in the foregoing publications include a multi-ported socket to which one set of conduits is connected and a multi-ported plug releasably received and locked in the socket with the plug ports communicating with the socket ports in fluid tight relationship. Three forms of construction include conical, flat wedge, and cylindrical opposed surfaces of the plug and socket. The present invention relates particularly to the type employing cylindrical surfaces although it can also be used with other types of construction, both tapered and non-tapered plugs and sockets, with both flat and non-flat surfaces, and with ports in bodies other than plugs and sockets.

Flat plane, cylindrical, and conical surface have in common that they are generated by motion of a straight line at a constant distance from an axis, the line being parallel to the axis the case of a cylinder and plane, the radius relative to the axis being infinite in the case of a plane.

It is more difficult to effect seals between the ports of cylindrical or parallel-sided box type plug and socket constructions than between the ports of conical or flat wedge type plug and socket constructions, for in nontapered constructions, the protuberant seal means on either the plug or socket is apt to be damaged when the connection is made up. Also, it is difficult with cylindrical or box types of construction to provide back-up metal-to-metal seals for the soft sealing means.

According to the Fowler patent mentioned above, there is provided a connection of the cylindrial type wherein seawater is excluded from the ports by protuberant soft seals extending around the plug above and below the ports, and intercommunication between the several ports in the plug and intercommunication between the several ports in the socket is prevented by a conduit tube extending from each plug port telescopically into a respective one of the socket ports. Alignment pins and slots bring the plug and socket ports into registry. Should the conduit tube actuator fail to withdraw the conduit tubes when it is desired to break the connection, there is no way to separate the plug and socket. The conduit tube in each case is mechanically propelled from the plug into the socket when the connection is made up, and each conduit tube is provided with protuberant O-rings to form a straddle pack-off between the plug and socket. In addition, pressurized fluent plastic seals are provided around each conduit tube and between the plug and socket. It will be seen that there is no metal-to-metal back-up seal for the seal rings, O-rings, or plastic sealant.

SUMMARY OF THE INVENTION

According to the present invention, some of the difficulties, complexities and costs of the above-described Fowler and other constructions are overcome by employing nontapered, e.g. cylindrical plug and socket members and in each plug port a hydraulically extended, spring retracted, seal tube provided about its outer periphery with O-rings making a sliding seal with the plug port and provided at its outer end with a seal ring, initially protuberant from the tube, but not from the plug, adapted to make a face seal with the inner periphery of the socket around the respective port when the tube is propelled thereagainst by hydraulic pressure on the other end of the tube. Since the seal tubes do not enter into the socket ports, there is no possibility of their preventing withdrawal of the plug from the socket whenever desired. The construction according to the invention avoids the problem of protuberant seal rings on the plug, which is most serious with a cylindrical or other nontapered plug and socket construction, and at the same time provide metal-to-metal back-up for the face seal. In this latter connection, the outer end of the seal tube and the seal ring are both contoured to be correlative to the inner periphery of the socket around the socket port, alignment means being provided between each seal ring and seal tube and between each seal tube and plug port to assure proper engagement of the tube and socket.

Typically, the axes of all the plug and socket ports are coplanar. In case more conduits need to be connected than there are suitable coplanar azimuthal positions about the periphery of the plug and socket, taking into account such factors as the circumference of the plug and the circumferential extent of each plug port, the ports need not have their axes coplanar. For example, several sets of coplanar ports with each set in a different plane may be employed, there being one or more pairs of connecting ports in each set. Since in the preferred embodiment of a multi-conduit connector for connecting remote controlled subsea three-way valves to subsea drilling equipment, there needs to be vertical space in the plug above each plug port to receive a three-way valve, the plug and socket can be stepped so that the connections in one plane are radially displaced from those in adjacent planes above and below. For ease of manufacture, the plug can be made of several horizontal layers or blocks, e.g., one for each set of coplanar ports, with the vertical fluid passages in the several blocks connected by straddle packers.

In order releasably to lock the plug and socket together, hydraulic locks are provided with hydraulic drive for retraction as well as extension so as to insure releasability.

BRIEF DESCRIPTION OF THE DRAWINGS

For a detailed description of a preferred embodiment of the invention, reference will now be made to the accompanying drawings wherein.

DESCRIPTION OF PREFERRED EMBODIMENT

- Pod -

Figure 1:
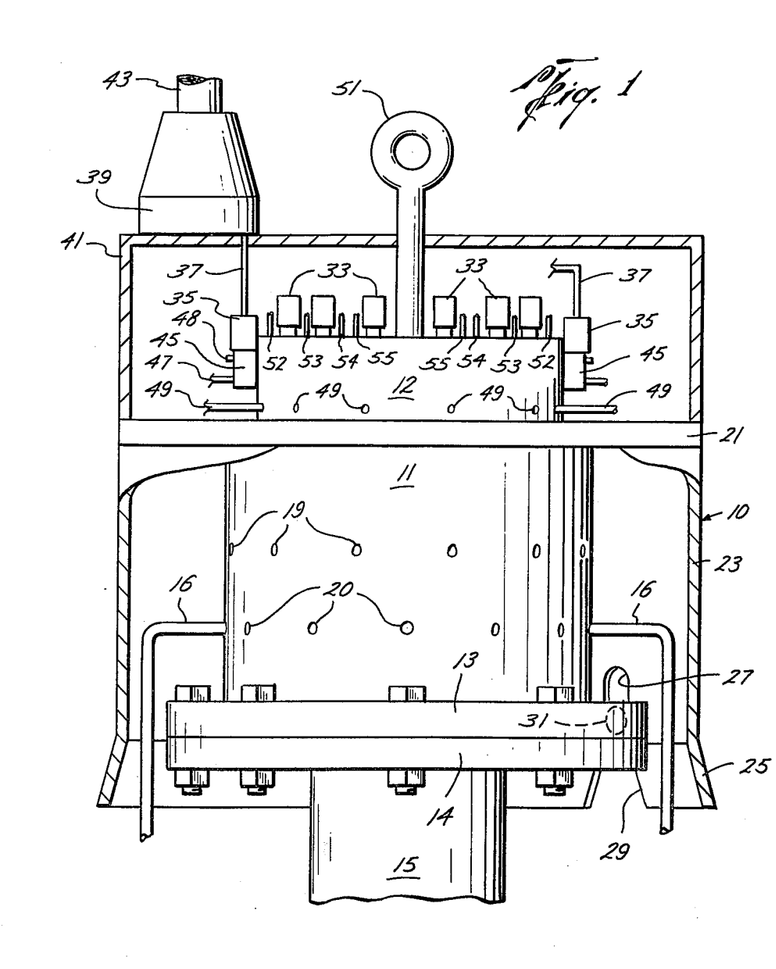
FIG. 1 is an elevation, partly in section, showing a preferred embodiment of a multiple subsea fluid conduit connection for remote controlled valves according to the invention.

Referring now to FIG. 1 there is shown a multiple subsea fluid conduit connection or pod 10, according to the invention, comprising a socket 11 and a plug 12. The socket has a base flange 13 which is bolted to flange 14 on upright 15 supported by the wellhead (not shown) therebelow. A plurality of fluid conduits or lines 16 are connected to upper and lower sets of colevel ports 19, 20.

Plug 12 is provided with a circumferential flange 21 which supports a protective skirt 23 that surrounds socket 11 and conduits 16. At the lower end of the skirt is a downwardly flaring guide flange 25 which helps to center the plug when it is lowered into the socket. A slot 27 in the skirt having a wide flaring entrance 29 slips over pin 31 on socket flange 13, thereby azimuthally orienting the plug and socket so that socket ports 19, 20 will register with the plug ports hereinafter described.

Surmounting plug 12 are housings 33 for springs which bias to the closed position remote controlled valves (see below) disposed in the plug which control the fluid conduits in the plug. Attached to the side of plug 12 are electric solenoids 35 connected to electric cables 37. Cables 37 extend into electric junction box 39 mounted on top of inverted cup-shaped cover 41 secured to the top of plug flange 21. Cables 37 connect to conductor bundle 43 leading to the surface, whereby electric signals can be sent down to actuate solenoids 35 as desired.

Solenoids 35 actuate pilot valves 45 to alternately connect pressure fluid line 47 and vent port 48 to the hydraulic cylinder (see below) for actuating the aforementioned remote controlled valves. The remote controlled valves are disposed in the plug and control delivery of hydraulic fluid to lines 16 from fluid conduit 49 connected to the outer periphery of plug 12.

An eye bolt 51 screwed into the tip of the plug provides means to move the plug into and out of the socket. A plurality of pressure fluid lines 52, 53, 54, 55 connected to the top of the plug provide means for actuating the seal tubes, hereinafter described, for connecting socket ports 19, 20 with the respective plug ports (described later), after the plug is lowered into the socket, and for actuating hydraulic locks (see below) for holding the plug in the socket.

Hydraulic Locked Plug and Socket

Figure 2:
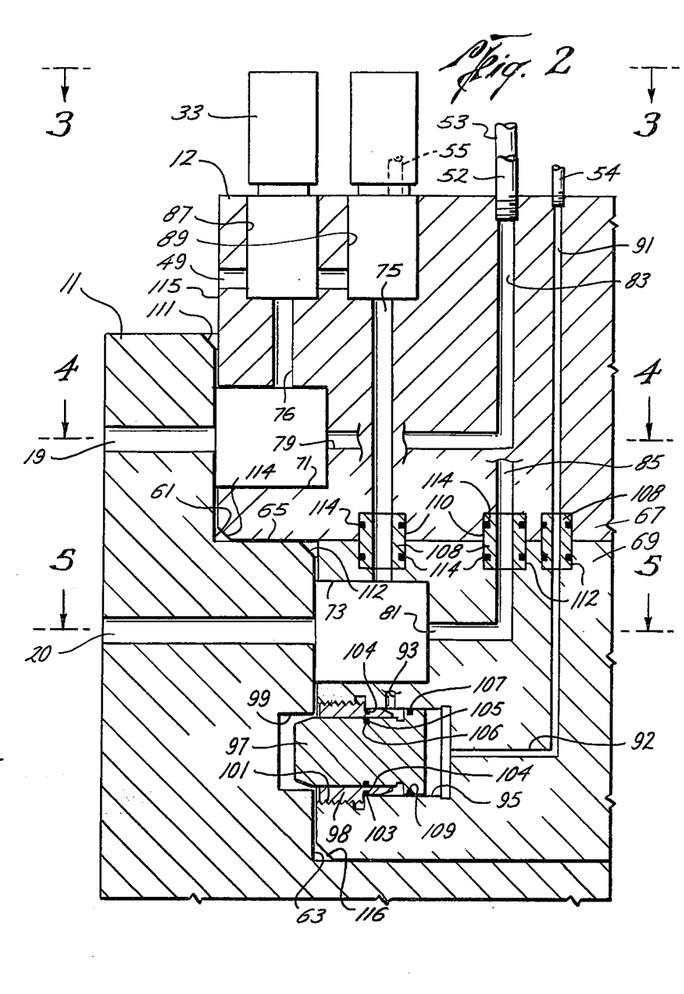
FIG. 2 is a schematic vertical section showing a portion of the apparatus of FIG. 1.

Referring now to FIG. 2, it will be seen that the interior of socket 11 is stepped, i.e., there are a plurality of cylindric inner peripheral surfaces 61, 63 of different diameters to which the several sets of colevel ports 19, 20 extend. The several inner peripheral surfaces 61, 63 are separated by horizontal annular shoulder 65.

Plug 12 includes a upper and lower cylindrical blocks 67, 69 suitably connected together, e.g., by bolts (not shown). Circumferentially spaced apart around the outer periphery of the upper and lower blocks are upper and lower sets of colevel cylindrical horizontal pockets 71, 73 each adapted to receive a remote actuated three-way valve to control flow from one of fluid supply conduits 49 one of to vertical passage means 75, 76.

A plurality of similar vertical passage means 91, 93 disposed annularly equidistant from the plug axis and radially inwardly and outwardly of passage means 83, 85, connect either directly or via azimuthally spaced radial ports 92 in lowermost block 69 of the plug, to the mid-portions (passage means 93) and the inner ends (passage means 91) of cylindric bores 95 within which are axially slidably disposed pistons 97. Pistons 97 are adapted to be extended hydraulically into radial bores 99 in the inner periphery of the lowest receptacle 63 of the socket, thereby to lock the plug in the socket. An externally threaded ferrule 98 fits closely about the reduced diameter outer end of each piston 97, forming in each case an outer pressure fluid chamber, each ferrule being screwed into a threaded socket 101 at the outer end of each bore 95. Each ferrule is sealed to bore 95 by an O-ring 103 in an annular groove 104 about the unthreaded inner end of the ferrule. Each piston is sealed to the ferrule by an O-ring 105 in an annular groove 106 in the reduced part of the piston. When hydraulic pressure is applied from passage means 91, pistons 97 are extended. Pistons 97 are retracted when hydraulic pressure is applied from passage means 93. O-ring 107 received in annular groove 109 seals piston 97 to bore 95.

Since fluid passage means 75, 85, 91, extend from the top block 67 of the plug into the bottom block 69, seal means is provided at the junctures of the blocks in the form of short tubes or seal subs 108 received in counterbores 110, 112 in blocks 67, 69. O-rings 114 seal the tubes to the counterbores.

Valve Pockets

Figure 3:
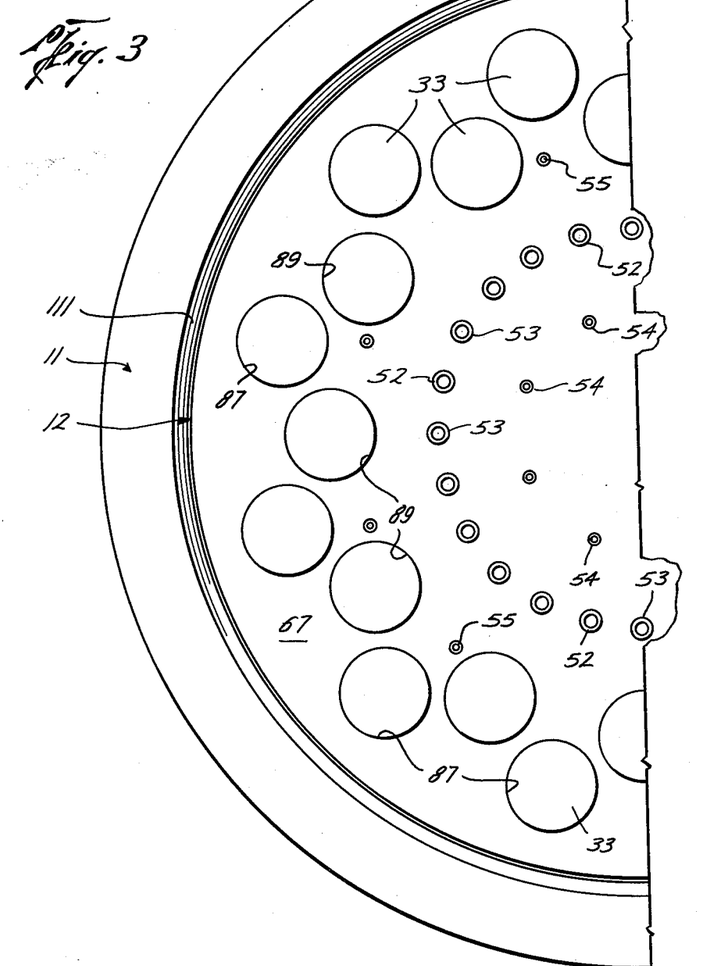
FIG. 3 is a top view of the apparatus of FIG. 2.

Referring now to FIG. 3, there is shown the horizontal or plan distribution of the circumferentially spaced, staggered pockets 87, 89 in which are received the remote controlled three-way valves, and the distribution of the circumferentially spaced vertical passage means 52, 53, 54, 55 for actuating the seal tube means and the hydraulic lock pistosn. Guide bevel 111 around the upper inner periphery of socket 11 assists in centering plug 12 when the latter is stabbed into the socket. A similar guide bevel 112 is seen in FIG. 2 for the lower receptable of the socket. Blocks 67 and 69 are provided with analogous guide bevels 114, 116.

Seal Tube Means Pockets; Pod Clearance

Figure 4:
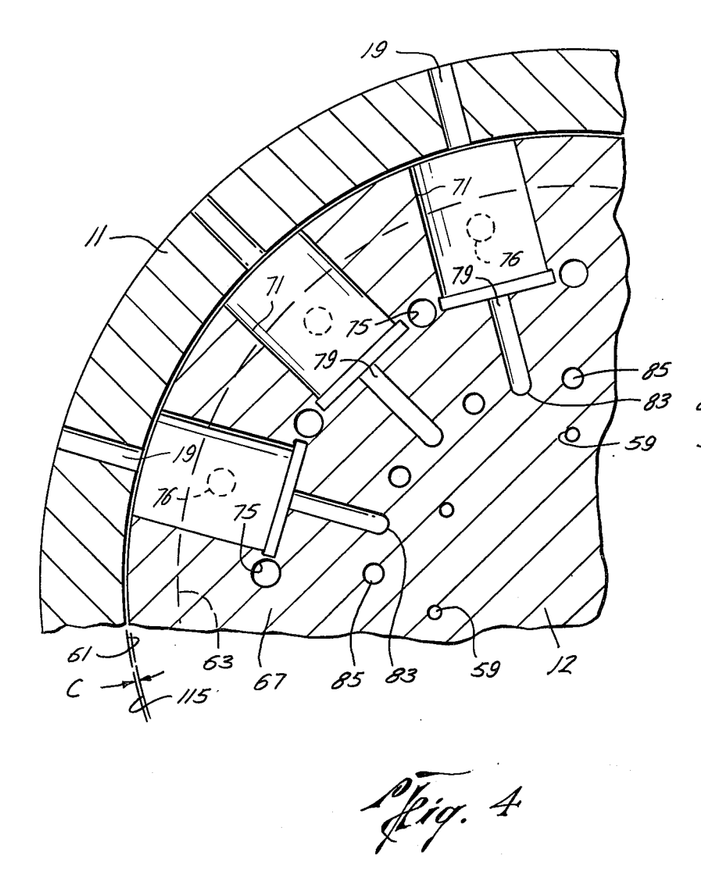
FIGS. 4 and 5 are sections taken at planes 4—4 and 5—5 of FIG. 2.
Figure 5:
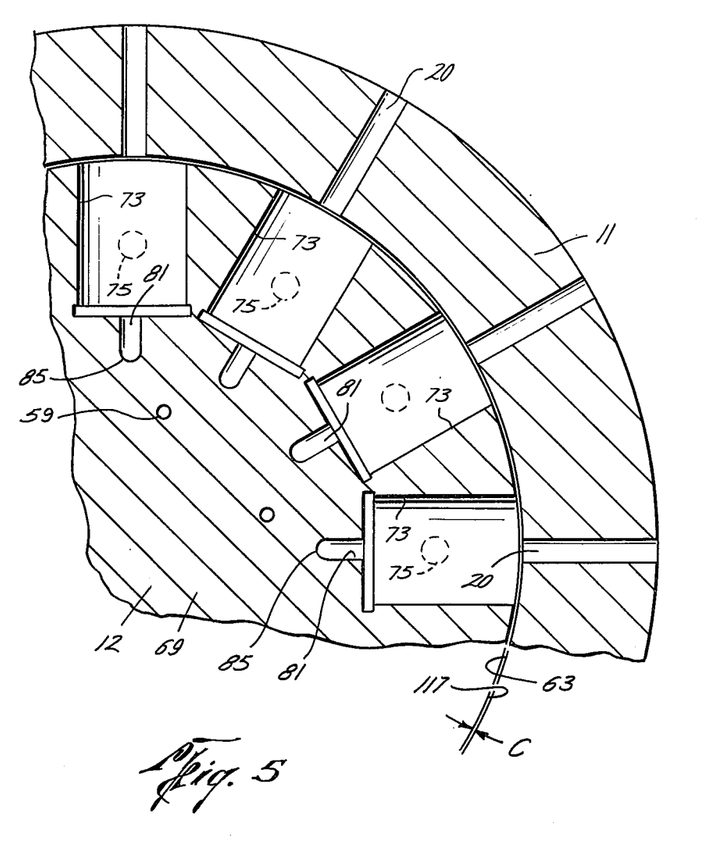

FIGS. 4 and 5 show the horizontal or plan distribution of the circumferentially spaced pockets 71 for the seal tube means in upper block 67 and the pockets 73 for the seal tube means in lower block 69, the latter being staggered slightly relative to pockets 71, so as to be vertically below valve pockets 89 (FIG. 3), whereas pockets 71 lie vertically below valve pockets 87. FIGS. 4 and 5 also show the plan distribution of vertical passage means 75 and 76 leading from the seal tube pockets to the valve pockets and vertical passage means 83, 85 leading from the seal tube pockets to hydraulic lines 52, 53, and vertical passage means 91, 93 leading to the hydraulic piston locks. Radial ports 79 and 81 connect to the inner ends of seal tube pockets 71 and 73; radial ports 19, 20 in socket 11 are in register with the seal tube pockets 71, 73. Shown at C is the up to 50 thousandths of an inch clearance "C" between the inner peripheries 61, 63 of the socket receptacles and the outer peripheries 115, 117 of plug blocks 67, 69.

Three-Way Valves

Figure 6:
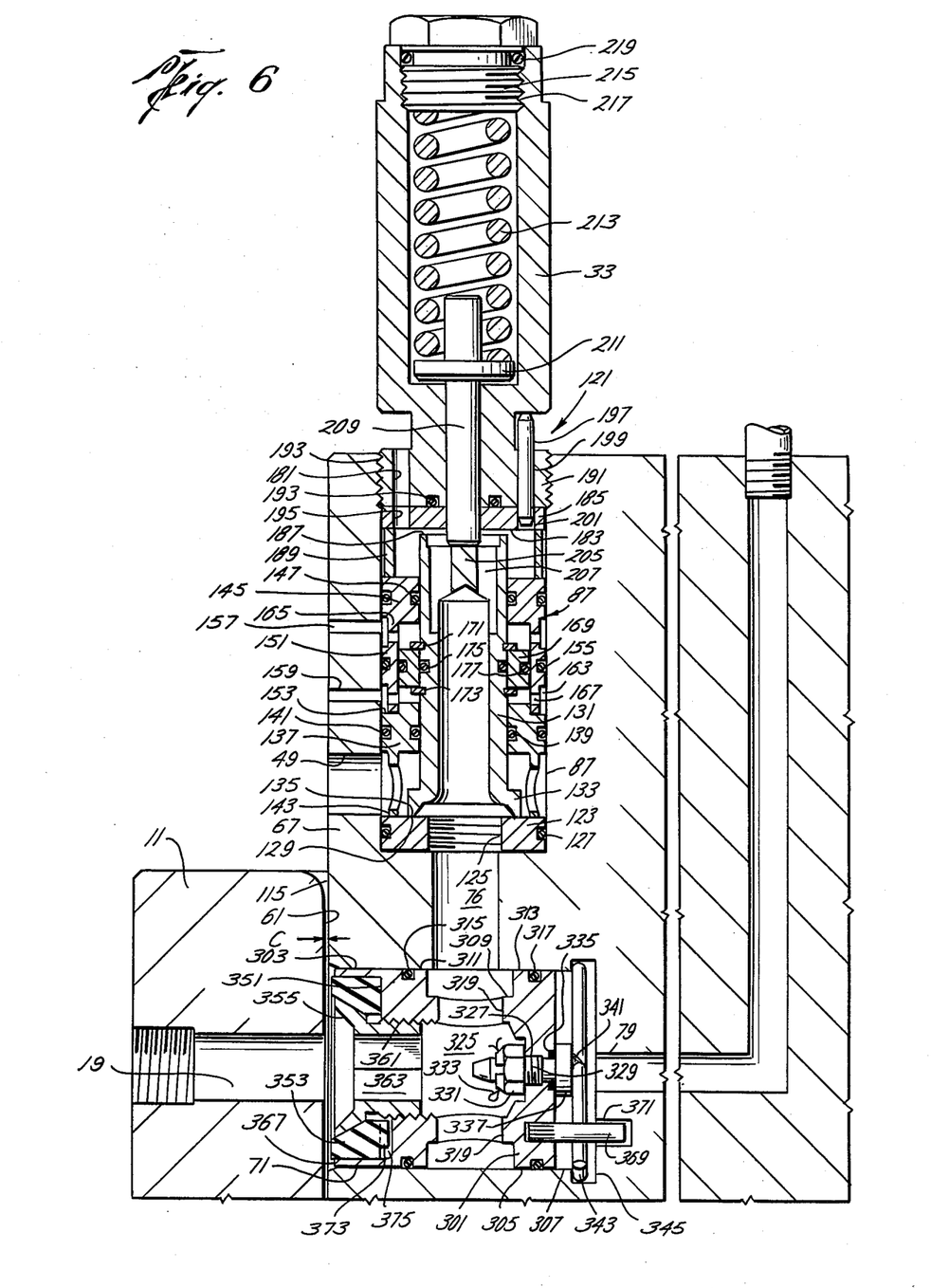
FIG. 6 is a view similar to FIG. 2, but to a larger scale and with more detail, showing one of the connections made up but with the seal tube retracted and the remote controlled valve in the closed position.
Figure 7:
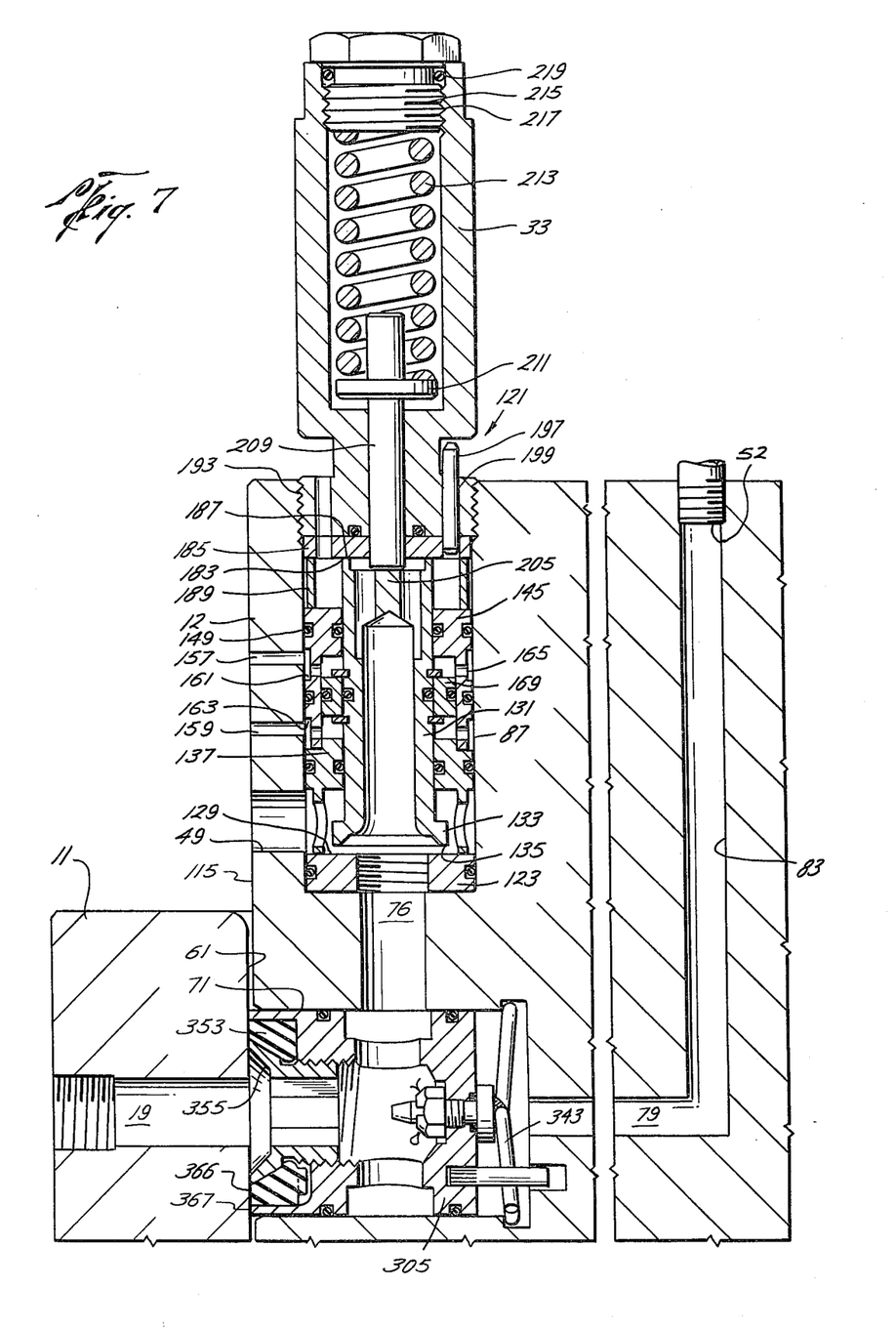
FIG. 7 is a view similar to FIG. 6 but with the seal tube extended and the remote controlled valve in the open position.

Referring now to FIGS. 6 and 7 there is shown one of the remote controlled three-way subsea valves 121 for controlling fluid flow from supply ports 49 to vertical passage means 76 (and 75). The valve includes a seat ring 123 having a threaded bore 125 to receive a tool for placing the ring in the bottom of pocket 87. Threaded bore 125 is coaxial with fluid passage means 76 and forms a continuation of the flow passage means. An O-ring 127 in an annular groove in the outer periphery of the seat ring seals the ring to pocket 87. The top of seat ring 123, which is level with the bottom of port 49, provides a planar valve seat 129.

Coaxial with seat ring 123 is tubular valve closure 131 having a downwardly flaring skirt 133 whose lower planar end 135 is adapted to make a face seal with valve seat 129. The upper end of closure 131 extends through bonnet ring 137. O-ring 139 in an annular groove inside the bonnet ring seals with the valve closure, and O-ring 141 in an annular groove on the exterior of the bonnet ring seals with pocket 87. Ported skirt 143 supports the bonnet ring from seal ring 123 at a level just above port 49.

Cylinder ring 145 extends around the upper end of the valve closure, being sealed thereto by O-ring 147 in an annular groove in its inner periphery. The outer periphery of cylinder ring 145 is sealed to pocket 87 by O-ring 149 in an annular groove in the outer periphery of the cylinder ring. Cylindrical skirt 151 extending down from the cylinder ring supports the ring in a rabbet 153 around the top of the bottom ring. The outer periphery of skirt 151 is sealed to the pocket by O-ring 155 at a level between ports 157, 159 in plug 12. Ports 157, 159 are alternately connected to hydraulic fluid supply and vent lines 47, 48 (FIG. 1) according to the position of solenoid actuated pilot valve 45.

Annular grooves 161, 163 around the outside of skirt 151 connect ports 157, 159 with skirt ports 165, 167 connecting to the volume inside the skirt respectively above and below piston 169. Piston 169 is secured axially to valve closure 131 by spring rings 171, 173 in annular grooves around the valve closure. O-ring 175 seals the piston to the valve closure and O-ring 177 axially slidably seals the cylindric exterior of the piston to the inner cylindric periphery of skirt 151.

According to whether pressure fluid is supplied above or below piston 169, valve closure 131 is moved into open position off seat 129 as in FIG. 7 or down into closed position against seat 129 as in FIG. 6. In closed position, valve closure 131 blocks flow from supply port 49 into passage means 76 while allowing fluid from the function to vent through 76 through the tubular valve closure and out exhaust passage 181 into the sea. When valve 131 is in open position (FIG. 7) pressure fluid from supply 49 passes through the fluid passage means and thence to the function. Fluid flow through the upper end of tubular valve closure 131 is blocked by the lower planar surface 183 of upper seat ring 185 against which the planar upper end 187 of the tubular valve closure seals.

Supported by cylinder ring 145 is spacer ring 189. Seat ring 185 rests on top of spacer ring 189. Threaded pin 191 on the lower end of spring housing 33 is screwed into the threaded box 193 in the upper block of the pin, bearing down on seat ring 185 and holding it against spacer ring 189. Pin 191 is sealed to upper seat ring 185 by O-ring seal 193 received in an annular groove in the lower end of the pin. Seal ring 185 has a port 195 which is kept in register with exhaust port 181 in pin 191 by roll pin 197 extending through holes 199, 201 in the pin 191 and seat ring 185.

Spider 205 in the upper end of tubular valve closure 131 is formed by a plurality of circumferentially spaced paraxial bores 207 in the otherwise blind upper end of closure 131. A rod 209 rests on top of spider 205 and extends through upper seal ring 185 and tubular pin 191 into the interior of tubular spring housing 33. A flange 211 on rod 209 receives the axial thrust of helical compression spring 213 inside housing 33, the spring bearing at its upper end against screw plug 215 screwed into the threaded box 217 at the upper end of the housing. O-ring 219 in an annular groove around plug 215 seals the plug to the housing. Spring 213 insures that the valve 121 is closed when there is no pressure fluid beneath piston 169, even if no pressure fluid is applied above piston 169.

Fluid passage means 76 each connect to the side of a pocket 71 within which is disposed a seal tube means 301 as exemplified by FIGS. 6 and 7 which show one pocket 71 and one seal tube means.

Seal Tube Means

Figures 8, 9:
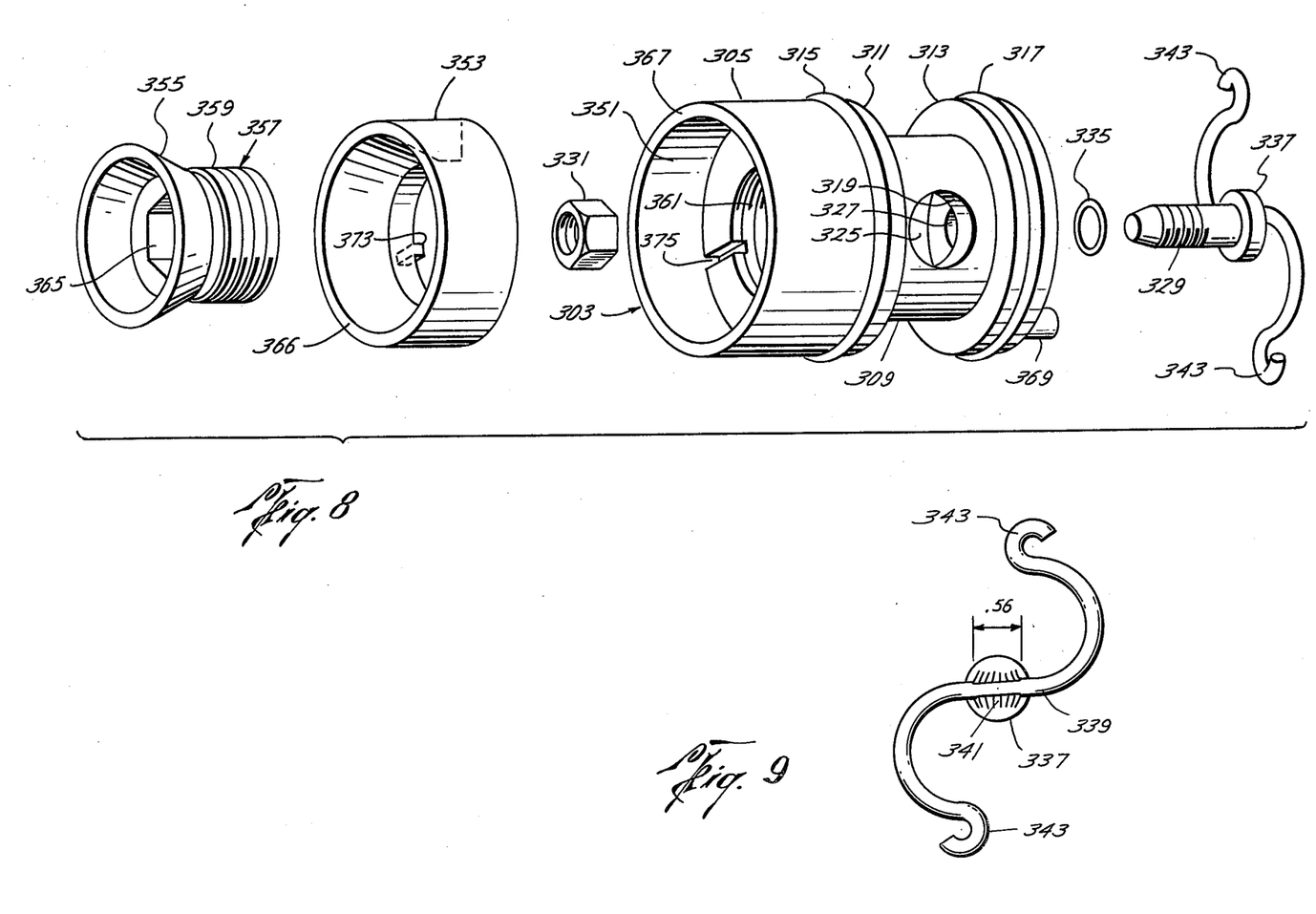
FIG. 8 is an exploded view of seal tube means employed in the apparatus of FIGS. 1-7.
FIG. 9 is a plan view of a spring retractor and screw forming part of the seal tube means.

Referring now to FIGS. 6 and 7 and also to FIGS. 8 and 9, seal tube means 301 comprises a cylinder 303 whose cylindric outer periphery 305 fits axially slidably within the cylindric inner periphery 307 of pocket 71. An annular groove 309 around the cylinder divides the cylindric outer periphery of the cylinder into two cylindrical lands 311, 313. The lands are sealed to the inner periphery of pocket 71 inwardly and outwardly of fluid passage means 76 by O-rings 315, 317, disposed in annular grooves in the lands. In this manner groove 309 is placed in fluid tight communication with fluid passage means 76. A plurality of radial ports 319 place groove 309 in communication with axial bore 325 extending to the outer end of the cylinder, there to communicate with socket port 19.

The inner end of cylinder 303 is provided with an axial bore 327 to receive bolt 329. The bolt is secured to the end of cylinder 303 by nut 331 and cotter pin 333. An O-ring in an annular rabbet around the end of bore 327 seals the bolt to the cylinder.

The head 337 of bolt 329 is secured a bar spring 339 (FIG. 9), e.g., by weld or solder 341. The ends of spring 339 are doubly curved to make the spring into a double S-shape so as to provide more length and have greater deformation or travel for any given load. The tips 343 of the spring are adapted to be received in annular groove 345 at the inner end of cylindrical pocket 71. By this means cylinder 303 is biased to the position shown in FIG. 6 wherein the end of the cylinder, in fact the whole seal tube means, is out of contact with and radially spaced from inner periphery 61 of the socket receptacle.

The outer end of the cylinder bore is provided with a rabbet 351 which receives a rubber seal ring 353. Seal ring 353 in the relaxed state is of bevelled rectangular cross-section, as shown in FIG. 8. When the ring is assembled in the seal tube means it is compressed against the sides of the rabbet by the flaring head 355 of tubular screw 357, as shown in FIGS. 6 and 7. The thread 359 of the screw engages thread 361 of the cylinder. Passage 363 through the screw forms a continuation of the flow passage provided by cylinder bore 325. Passage 363 is generally cylindrical but has an outer portion 365 (FIG. 8) of hexagonal section to receive an Allen wrench for turning the screw during assembly and disassembly.

When fluid pressure is applied to the inner end of cylinder 351 from fluid passage means 83 and port 79, sufficient to overcome the force of spring 339, the cylinder is moved radially outwardly into engagement with inner periphery 61 of the socket receptacle, as shown in FIG. 7. To fit periphery 61, the outer end 366 of seal ring 353 and the outer end 367 of cylinder 303 are cylindric about an axis concentric with periphery 61. To maintain cylindric ends 366, 367 concentric with periphery 61, cylinder 303 is provided with an orientation pin 369 which fits in alignment hole 371 in plug block 67. Seal ring 353 is provided with an alignment lug or key 373 which fits in an alignment slot 375 in cylinder 303. Rubber seal ring 353 deforms further, as it engages periphery 61, to conform to and seal with the socket receptacle. By this means, namely, seal tube means 301, socket port 19 is placed in fluid tight communication with fluid passage means 76 leading to remote actuated three-way subsea valve 121 and thence, when the valve is open, to fluid supply port 49.

Seal ring 353 has been described as being made of rubber, an elastomer. Other elastic plastics material of low elastic modulus may be employed, preferably polyurethane. In any event, a material having an elastic modulus of between 80 and 90, e.g. 85 on the Shore A seal is preferred.

While a preferred embodiment of the invention has been shown and described modifications thereof can be made by one skilled in the art without departing from the spirit of the invention.

I claim:

1. Conduit connection comprising:
a first body having a first passage therein providing a conduit,
a second body having a second passage therein providing a conduit,
said second body having an opening therein adjacent one end of the second passage,
connection means slidably disposed in said opening for movement between a retracted position in which it is out of engagement with said first body and an extended position in which it engages the first body outside of said first passage in an area extending around said first passage without interlocking said bodies against relative movement transverse to the direction of extension of said connection means,
said connection means having a third passage therethrough adapted to communicate with said first and second passages when said connection means is extended, and
actuation means for moving said connection means between extended and retracted positions,
said second passage having a near end adjacent said area where said connection means when extended engages said second body,
said third passage having a proximal end which when said connection means is extended contacts said area, and
when said connection means is extended all points on said near end of said second passage and said area therearound being on the side away from said first body of a plane perpendicular to the direction of movement of said connection means which plane passes through the points on said proximal end of the connection means which are farthest from said first body.

2. Connection according to claim 1, including:
first seal means slidably to seal the junction of said second and third passages, and
second seal means to make a face seal with the junction of said first and third passages when said connection means is extended.

3. Connection according to claim 2,
said second seal means comprising a seal ring carried by said connection means at an end face thereof and protuberant axially therefrom when said connection means is retracted,
said seal ring being disposed in annular groove means in the connection means,
said annular groove means having more volume than the part of said seal ring disposed therein when said connection means is retracted,
said seal ring flowing into the annular groove means when the protuberant part is compressed against said first body when said connection means is extended.

4. Connection according to claim 1,
said first body being a socket and said second body being a plug adapted to be received in said socket with clearance between the sides of said plug and socket;
said connection means spanning said clearance when said connection means is extended.

5. Conduit connection comprising:
a first body having a first passage therein providing a conduit,
a second body having a second passage therein providing a conduit,
said second body having an opening therein adjacent one end of the second passage,
connection means slidably disposed in said opening for movement between an extended position in which it engages the first body outside of said first passage in an area extending around said first passage and a retracted position in which it is out of engagement with said first body,
said connection means having a third passage therethrough adapted to communicate with said first and second passages when said connection means is extended, and
actuation means for moving said connection means between extended and retracted positions,
first seal means slidably to seal the junction of said second and third passages, and second seal means to make a face seal with the junction of said first and third passages when said connection means is extended, said first seal means comprising seal ring means mounted about the outer periphery of the connection means adapted to make an axially sliding seal with said opening, said seal ring means comprising axially spaced apart annular seal rings, said third passage extending to said outer periphery of said connection means between said spaced apart seal rings, said second passage connection to the inner periphery of said opening.

6. Connection according to claim 5,
said opening being generally cylindrical,
said connection means having a generally cylindrical outer periphery fitting inside said opening and adapted to slide axially therein between retracted and extended positions,
said second seal means comprising a seal ring carried by said connection means at an end thereof and protuberant axially therefrom when said connection means is retracted.

7. Connnection according to claim 6 or 5,
said actuation means including spring means biasing said connection means to retracted position
and hydraulic means for moving said connection means to extended position.

8. Connection according to claim 7,
said opening having an annular groove in its inner periphery,
said spring means including a bar spring secured to said connection means and extending into said annular groove.

9. Connection according to claim 7
said hydraulic means comprising a piston formed by the end of said connection means having an area equal to the cross-section of the cylindrical said opening, and fluid passages means connected to said opening for admitting hydraulic fluid under pressure to said opening adjacent said piston.

10. Conduit connection comprising:
a first body having a first passage therein providing a conduit,
a second body having a second passage therein providing a conduit,
said second body having an opening therein adjacent one end of the second passage,
connection means slidably disposed in said opening for movement between an extended position in which it engages the first body outside of said first passage in an area extending around said first passage and a retracted position in which it is out of engagement with said first body,
said connection means having a third passage therethrough adapted to communicate with said first and second passages when said connection means is extended, and
actuation means for moving said connection means between extended and retracted positions,
said second body including a second opening at one side of said second passage,
valve means in said second opening controlling flow of fluid in said first passage and from said second passage,
said actuation means normally maintaining said connection means extended regardless of whether said valve means is open or closed.

11. Conduit connection comprising:
a first body having a first passage therein providing a conduit,
a second body having a second passage therein providing a conduit,
said second body having an opening therein adjacent one end of the second passage,
connection means slidably disposed in said opening for movement between an extended position in which it engages the first body outside of said first passage in an area extending around said first passage and a retracted position in which it is out of engagement with said first body,
said connection means having a third passage therethrough adapted to communicate with said first and second passages when said connection means is extended, and
actuation means for moving said connection means between extended and retracted positions,
said first body being a socket and said second body being a plug adapted to be received in said socket, and including alignment means to align said first and third openings when said plug is in said socket,
said socket having a cylindrical inner periphery,
said plug having a cylindrical outer periphery smaller in diameter than said inner periphery, there being radial clearance between said peripheries when said plug is in said socket,
said connection means spanning said clearance when said connection means is extended,
said connection means engaging said first body at one end when said connection means is extended,
said one end having a cylindric surface which when said connection means is extended is concentric with said peripheries of said plug and socket, and
means aligning said connection means and opening in said second body to prevent said connection means from rotating about its axis,
whereby when said connection means is extended said cylindric surface will fit said cylindrical inner periphery of said socket.

12. Connection according to claim 11,
said connection means including a tubular body having at one end annular seal means to make a face seal with the junction of said first and third passages when said connection means is extended,
said annular seal means having a cylindric surface which when said connection means is extended is concentric with said peripheries of said plug and socket, and
means aligning said annular seal means and tubular body to prevent rotation of said annular seal means about the axis of said tubular body, whereby when said connection means is extended said cylindric surface of the seal means will fit said cylindrical inner periphery of said socket.

13. Connection according to claim 11,
said cylindric surface at said one end of said connection means being a metal annular surface extending around said third passage means,
said connection including resilient annular seal means carried by said connection means adjacent said one end and extending around said third passage means radially closer to said third passage means than said cylindric surface.

14. Multiple subsea fluid conduit connection for remote controlled valves comprising:
  a socket including a plurality of receivers having cylindrical inner peripheral surface of progressively increasing diameters proceeding upwardly from the bottom of the socket,
  a plug comprising a plurality of cylindrical blocks secured together coaxially and each adapted to be received telescopically within one of said receivers when said plug and socket are oriented azimuthally about the socket axis and means for releasably securing said plug in said socket,
  said receivers each having a plurality of circumferentially spaced colevel radial ports there through,
  said blocks each having a plurality of circumferentially spaced colevel radially extending cylindrical pockets therein adapted to register with the ports of the respective receptacle in which the block is received,
  a first plurality of paraxial passage means in the plug extending upwardly one from the side of each of said pockets into the uppermost block, the passage means from the pockets in each block being equidistant from the plug axis at a radial distance progressively increasing in each block proceeding upwardly,
  a chamber in the upper block connected one to each of said passage means and opening at its upper end at the upper surface of the upper block, said chambers being disposed in concentric circles about the plug axis at different radial distances from the plug axis according to the set of paraxial passages to which they are connected, with the chambers connected to the passages extending to the lowermost block lying in a circle having the smallest radius and the chambers connected to passages extending to such higher block lying in a circle having a greater radius,
  a plurality of radial flow paths in the upper block, one leading to each of said chambers,
  valve means in each chamber controlling fluid flow between the respective flow path and passage connecting thereto,
  a plurality of seal tubes means disposed one in each pocket, each seal tube means comprising a tube having an axial opening, a circumferential groove around the tube communicating with the respective passage means in the plug,
  a radial port connecting the groove with the axial opening, the axial opening communicating at one end with the socket port in register with the respective pocket,
  O-ring seals around the ends of the tube at each side of the groove adapted to make sliding seals between the seal tubes and pocket,
  annular seal means in the seal tube around the one end of the axial opening that registers with the respective socket port, the other end of the opening in the seal tube being closed and subject to the fluid pressure in the inner end of the pocket tending to urge the seal tube means outwardly whereby the annular seal means is urged into engagement with the inner periphery of the socket,
  the annular seal means being contoured to fit the cylindrical inner periphery of the socket, a pin extending from the inner end of the tube into a bore in the plug to orient the seal tube azimuthally about its axis so that the contoured seal means fits the inner periphery of the socket,
  a bar spring attached to the inner end of the seal tube extending transversely to the axis of the tube, the spring having curved ends extending circumferentially about the axis of the tube at a greater radius than that of the tube, and an annular groove around the inner periphery of the inner end of the pocket receiving said curved ends of the spring, the spring tending to hold the seal tube retracted with said seal means out of contact with the socket,
  each block having a plurality of radial ports extending inwardly one from the inner end of each pocket and a second plurality of paraxial fluid passage means extending upwardly from the last said radial ports to the top of the uppermost block, the second passage means from the pocket in each block being equidistant from the plug axis at a radial distance progressively increasing in each block proceeding upwardly,
  said second flow passage means and the last said radial ports providing means to conduct pressure fluid to the inner ends of the pockets to overcome the bar springs and extend the seal tubes means outwardly for engagement of the annular seal means thereon with the socket.

15. Conduit connection comprising:
  a first body having a first passage therein providing a conduit,
  a second body having a second passage therein providing a conduit,
  said second body having an opening therein adjacent one end of the second passage,
  connection means slidably disposed in said opening for movement between an extended position in which it engages the first body outside of said first passage in an area extending around said first passage and a retracted position in which it is out of engagement with said first body,
  said connection means having a third passage therethrough adapted to communicate with said first and second passages when said connection means is extended, and
  actuation means for moving said connection means between extended and retracted positions,
  said connection means moving along a linear path between extended and retracted positions and having ends transverse to said path, one of said ends being the part of the connection means adapted to engage said first body,
  said actuation means acting against the other of said ends,
  said second passage joining said opening to one side of said path,
  said third passage extending from said one end to said one side.

16. Connection according to claim 15, including,
  first seal means slidably to seal the juncture of said second and third passage means,
  said first seal means comprising seal rings about said connection means in spaced apart planes transverse to said path at opposite sides of said third passage means where it opens to said opening at one side of the path.

17. Connection according to claim 16.
  said actuation means including spring means biasing said connection means to retracted position and hydraulic means for moving said connection means to extended position, said hydraulic means comprising a solid disc shaped piston formed by the end of said connection means and fluid passage means connected to said opening for admitting hydraulic fluid under pressure to said opening adjacent said piston, one of said seal rings being positioned about said piston slidably sealing it to said opening.

18. Conduit connection according to claim 4 or 10 first body being a socket and said second body being a plug adapted to be received in said socket, and including alignment means to align said first and third openings when said plug is in said socket, said socket having a cylindrical inner periphery, said plug having a cylindrical outer periphery smaller in diameter than said inner periphery, there being radial clearance between said peripheries when said plug is in said socket, said connection means spanning said clearance when said connection means is extended, said plug having a stepped cylindrical outer periphery forming upper and lower annular surfaces, said socket having a stepped cylindrical inner periphery forming upper and lower annular surfaces adapted to receive said plug, there being a plurality of sets of said conduits and openings and connection means circumferentially spaced around said upper and said lower annular surfaces of said plug and socket, said second body including for each of the second passages a second opening at one side of the second passage, and valve means, one in each said second opening controlling flow through the second passage, the second openings which connect to the second passages that go to the openings in the lower annular suface of the plug being annularly disposed radially inwardly of the annularly disposed second openings which connect to the second passages that go to the openings in the upper annular surface of the plug.

19. Connection according to claim 18, said second openings that are annularly disposed inwardly of the other annularly disposed second openings being staggered azimuthally relative thereto.

20. Connection according to claim 18, said plug being divided horizontally into upper and lower blocks, the upper block having said upper annular surface and the lower block having said lower annular surface, said connection including seal subs interconnecting the portions of said passages therein extending into both of said blocks.

21. Connection according to claim 5 or 15, said plug and socket being stepped, forming a plurality of levels, there being a plurality of sets of said connection means disposed one set at each level of said plug.

22. Connection according to claim 21, said plug being divided horizontally into blocks, and seal subs interconnecting passages in said blocks.

23. Connection according to claim 22, the inner periphery of the socket including at least one aperture, the outer periphery of the plug including hydraulic bolt means forming a hydraulic cylinder with a piston therein having a piston rod projectable from the cylinder into the aperture upon application of hydraulic pressure to one side of the piston and retractable from the aperture upon application of hydraulic pressure to the other side of the piston.

24. Connection according to claim 23, there being a plurality of said apertures circumferentially spaced apart around said inner periphery of said socket and a plurality of said hydraulic bolt means circumferentially spaced apart around the outer periphery of said plug and adapted to register with said apertures.

25. Connection means according to claim 24 including passage means in said plug to supply hydraulic pressure fluid selectively to opposite ends of said piston.

26. Conduit connection comprising:

a first body having a first passage therein providing a conduit, a second body having a second passage therein providing a conduit, said second body having an opening therein adjacent one end of the second passage, connection means slidably disposed in said opening for movement between an extended position in which it engages the first body outside of said first passage in an area extending around said first passage and a retracted position in which it is out of engagement with said first body, said connection means having a third passage therethrough adapted to communicate with said first and second passages when said connection means is extended, and actuation means for moving said connection means between extended and retracted positions, said first body being a socket and said second body being a plug adapted to be received in said socket, said plug and socket having correlative surfaces to be adjacent when said plug is in said socket, said correlative surfaces being surfaces generated by rotating a straight line about an axis at a constant distance R therefrom when R has a length between X and infinity and X is greater than zero, there being a clearance between said correlative surfaces when said plug is in said socket, said connection means spanning said clearance when said connection means is extended, said connection means engaging the one of said correlative surfaces that is on said first body at one end when said connection means is extended, said one end having a surface correlative to one of said correlative surfaces and adapted for engagement therewith without interlocking said plug and socket.

27. Conduit connection comprising:

a first body having a first passage therein providing a conduit, a second body having a second passage therein providing a conduit, said second body having an opening therein adjacent one end of the second passage, connection means slidably disposed in said opening for movement between an extended position in which it engages the first body outside of said first passage in an area extending around said first passage and a retracted position in which it is out of engagement with said first body, said connection means having a third passage therethrough adapted to communicate with said first and second passages when said connection means is extended, and actuation means for moving said connection means between extended and retracted positions, said actuation means including spring means biasing said connection means to retracted position and hydraulic means for moving said connection means to extended position, said opening having an annular groove in its inner periphery, said spring means including a bar spring secured to said connection means and extending into said annular groove.

28. Connection according to claim 27, said bar spring being of double S curvature and attached to said connection means at its mid-portion and its curved ends fitting in said annular groove.

29. An underwater connector for interconnecting a plurality of fluid lines comprising a first member adapted to be positioned underwater, said member including at least one upright positioned surface generated by rotating a straight line about an axis at a constant distance R therefrom where R has a length between X and infinity and X is greater than zero and when R is infinity the surface is flat, said surface providing a side of said member, said side having a plurality of fluid passageways terminating at said side, a second member adapted to engage and disengage from said first member, said second member including at least one upright positioned surface generated by rotating a straight line about an axis at a constant distance R therefrom where R has a length between X and infinity and X is greater than zero and when R is infinity the surface is flat, said surface providing a face of said member for alignment with but spaced from the first member side when engaged for providing a venting space therebetween and having a plurality of passageways terminating at said second member face for axial alignment with the first member passageways, a valve seat being provided at the first member side about each of the first member passageways, valve means including, positioned in each of the second member passageways, a movable valve element, a hydraulic fluid supply port, and pilot actuated means connected to and actuating the valve element, and said valve element when moved to one position seats on the valve seat on the first member and provides a path which opens to the fluid supply port for providing actuating fluid to the second member, and when moved to a second position, at which time said valve means can close the fluid supply port, is removed from the valve seat for allowing fluid in the first member to vent into said space.

30. The apparatus of claim 29 including, a resilient seal connected to said valve element and adapted to seat on the valve seat, and said seat being of metal.

31. The apparatus of claim 30 wherein the seat and said seal are circular and the width of the resilient seal is less than the full width of the valve engageable with the seat for providing higher unit sealing forces.

32. An underwater connector for interconnecting a plurality of fluid lines comprising a first male member adapted to be positioned underwater, said member having first and second exterior diametrically opposing surfaces generated by rotating a straight line about an axis at a constant distance R therefrom where R has a length between X and infinity and X is greater than zero and when R is infinite the surfaces are flat, said surface providing for said member its sides, and having a plurality of fluid passageways extending from each side, a correlative female member, one of said members being retrievable, said female member having first and second surfaces generated by rotating a straight line about an axis at a constant distance R therefrom where R has a length between X and infinity and X is greater than zero and when R is infinite the surfaces are flat, the last said surfaces providing interior faces and adapted to engage and disengage from said first member, said faces positioned for alignment with but spaced from the first member sides when engaged for providing a venting space therebetween and having a plurality of passageways terminating at said interior faces for axial alignment with the first member passageways, a metal valve seat being provided at the first member sides about each of the first member passageways, valve means including, positioned in each of the second member passageways, a movable valve element, a hydraulic supply port, and pilot actuated means connected to and actuating the valve element, said valve element when moved to one position seats on the valve seat on the first member and provides a path which opens to the fluid supply port for providing actuating fluid to the second member, and when moved to a second position at which time said valve means can close the fluid supply port, is removed from the valve seat for allowing fluid in the first member to vent into said space, and a resilient seal connected to said valve element and adapted to seat on the metal valve seat.

33. The apparatus of claim 32 wherein the seat and said seal are circular and the width of the resilient seal is less than the full width of the valve element engageable with the seat for providing higher unit sealing forces.

* * * * *

UNITED STATES PATENT AND TRADEMARK OFFICE
CERTIFICATE OF CORRECTION

PATENT NO. : 4,457,489
DATED : JULY 3, 1984
INVENTOR(S) : SAMUEL E. GILMORE

It is certified that error appears in the above—identified patent and that said Letters Patent is hereby corrected as shown below:

Column 1, line 42; after "axis" insert -- in --.
Column 3, line 62, change "tip" to -- top --.
Column 4, line 18, change "one of to" to -- to one of --.
Column 4, line 58, change "pistosn" to -- pistons --.
Column 7, line 45; delete "seal" and insert -- scale --.
Column 7, line 47; insert --, -- after "described".

IN THE CLAIMS

Claim 18, Column 13, line 10; delete "4 or 10" and insert -- 5 or 15 --.
Claim 18, Column 13, line 11; before "first body" insert -- said --.
Claim 21, Column 13, line 57; delete "5 or 15" and insert -- 4 --.
Claim 26, Column 14, line 41; delete "when" and insert -- where --.

Signed and Sealed this

Twenty-sixth Day of February 1985

[SEAL]

Attest:

DONALD J. QUIGG

Attesting Officer

Acting Commissioner of Patents and Trademarks